United States Patent [19]

Ryder et al.

[11] Patent Number: 4,757,428

[45] Date of Patent: Jul. 12, 1988

[54] HEADLAMP MOUNTING ASSEMBLY

[75] Inventors: Francis E. Ryder; Stephen P. Lisak, both of Arab, Ala.

[73] Assignees: Ryder International Corporation, Arab, Ala.; Textron Inc., Providence, R.I.; a part interest

[21] Appl. No.: 21,245

[22] Filed: Mar. 3, 1987

[51] Int. Cl.$^4$ .................. F21V 19/02; B60Q 1/04
[52] U.S. Cl. .................. 362/66; 362/270; 362/273; 362/368; 362/371; 362/420; 362/421; 362/424; 362/428
[58] Field of Search .......... 362/66, 80, 270, 273, 362/368, 371, 418, 419, 420, 421, 424, 427, 428

[56] References Cited

U.S. PATENT DOCUMENTS

| Re. 32,088 | 2/1986 | Sip | 362/273 |
|---|---|---|---|
| 2,733,335 | 1/1956 | Falge | 362/273 |
| 3,594,569 | 7/1971 | Cranmore | 362/419 |
| 4,188,655 | 2/1980 | Tallon et al. | 362/421 |
| 4,333,131 | 6/1982 | Hujimoto et al. | 362/419 |
| 4,503,486 | 3/1985 | Makita | 362/66 |
| 4,524,407 | 6/1985 | Igura | 362/273 |
| 4,574,334 | 3/1986 | Igura | 362/371 |
| 4,621,307 | 11/1986 | Weber | 362/66 |
| 4,674,018 | 6/1987 | Ryder et al. | 362/424 |
| 4,689,725 | 8/1987 | Saijo et al. | 362/428 |

Primary Examiner—George L. Walton
Attorney, Agent, or Firm—Trexler, Bushnell, Giangiorgi & Blackstone, Ltd.

[57] ABSTRACT

An assembly for adjustable mounting of a headlamp assembly relative to a frame permits both vertical and horizontal pivotal movement of the headlamp assembly relative to the frame to allow aiming of the headlamp beam. The frame has an elongate slot for receiving the mounting assembly and the headlamp assembly has a housing to be coupled to the mounting assembly so as to permit pivotal motion for adjustment thereof relative to the frame. The mounting assembly comprises a slot engaging member of an elastomeric, rubber-like material for slidably engaging the elongate slot of the frame and having a pair of spaced parallel surfaces joined by a transverse, generally vertical portion configured and arranged for slidable engagement with said elongate slot while imparting a controlled amount of gripping frictional force; and a threaded fastener having an elongate threaded shaft and an enlarged head, the enlarged head being engaged with the slot engaging member and the threaded shaft extending outwardly for engagement with the headlamp housing.

19 Claims, 5 Drawing Sheets

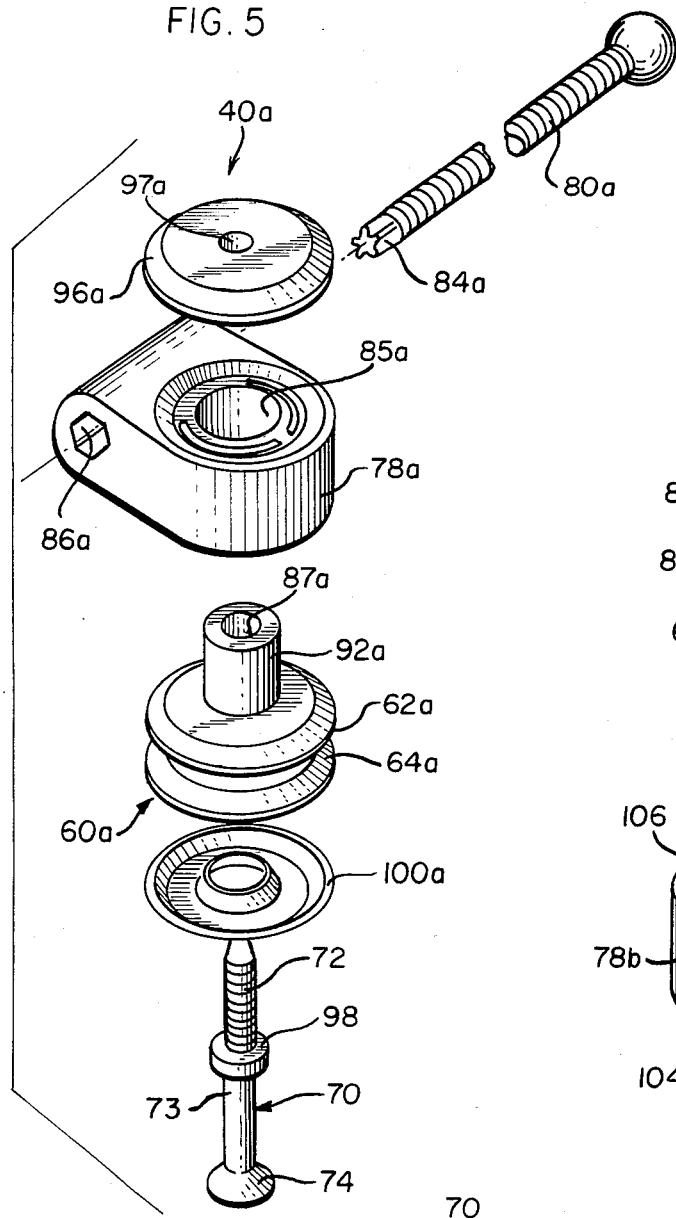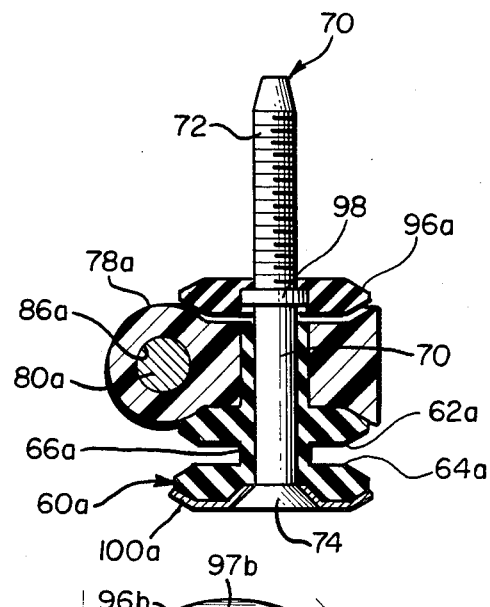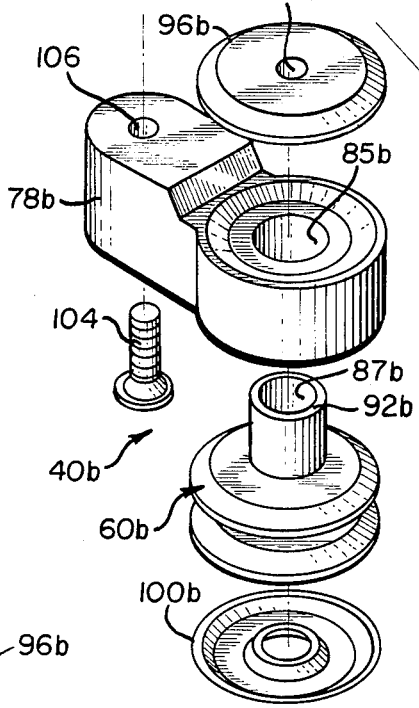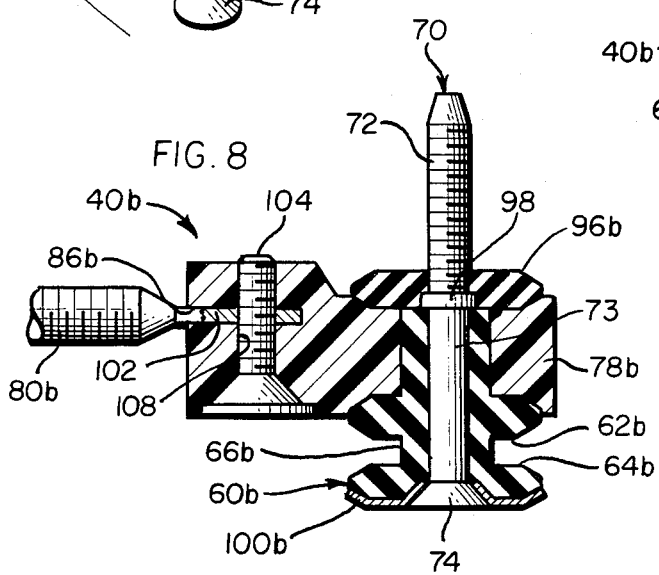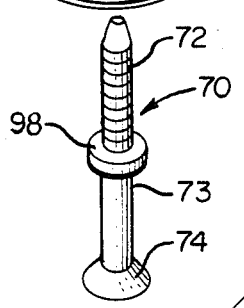

HEADLAMP MOUNTING ASSEMBLY

BACKGROUND OF THE INVENTION

This invention is directed generally to the automotive arts and more particularly to a novel and improved headlamp mounting assembly.

Automobile and other automotive vehicle headlamps are generally provided as separately mounted sealed beam type lamps which are separately adjustable by adjusting screws or other similar adjustment assemblies. These headlamps are required to be adjusted upon assembly with a vehicle to assure proper aiming of the headlamp beams relative to both horizontal and vertical axes. Often, the adjusting screws or like members are accessible only upon removal of certain trim or bezel components. Other problems were often encountered in that the adjusting screws would become corroded or fouled with rust, road grime and the like, rendering the adjustment procedure time consuming and difficult.

Modern headlamp assemblies have now been proposed which utilize an integral headlamp assembly comprising a housing which contains the necessary headlamp components. With the introduction of more aerodynamically efficient vehicle body shapes, the headlamps have been designed to fit the body contour more closely, rendering older, sealed beam type arrangements with exterior adjustments, bezels and the like, obsolete.

Accordingly, it has been proposed to utilize an adjusting mechanism for the headlamps which is designed to be mounted primarily interiorly of the vehicle, mounting the headlamp housing portion to a vehicle frame member. These modern headlamp adjusting mechanisms are arranged to be easily and readily operated to adjust both horizontal and vertical positioning or aiming of the light beam.

One such prior art arrangement is in the form of a plastic housing into which a pair of crown or bevel gear members are mounted, one gear member being affixed to an elongate shaft which is coupled through other components to the headlight assembly, and the other gear being coupled to an elongate shaft which may be rotated utilizing a hand tool, or by motorized assembly if desired. The adjusting shaft rotates with its associated beveled gear and is coupled to the headlamp housing such that rotation of the adjusting gear will produce a pivoting or tilting movement of the headlamp housing in the horizontal or vertical direction a required.

A number of headlamp mounting arrangements have been proposed for mounting the headlamp in a pivotally movable or floating condition about both vertical and horizontal axes to accommodate the necessary movement thereof for aiming in response to such an adjustment device, while maintaining the headlamp housing firmly affixed in the desired location relative to the vehicle frame member. One such arrangement has been proposed utilizing snap-in ball joint type of assemblies for mounting the headlamp to the frame member. Such an assembly is shown for example is U.S. Pat. No. Re. 32,088. However, with the development of a number of different vehicle bodies and assemblies requiring different headlamp shapes and styles, a number of different adjustment mechanisms have been developed and modified over successive models and years, such that it is difficult or impossible to propose but a single assembly for use in all such vehicles.

Moreover, the provision of ball joint type connectors gives rise to a number of other problems regarding the proper secure mounting of such connectors, as well as the relative expense of manufacturing and providing the necessary ball and socket type connectors in relatively inexpensive mass produced form. Moreover, a number of difficulties have been encountered in providing suitable mechanisms and means for mounting the ball receiving socket components at the necessary points in the vehicle frame and/or the headlamp assembly to reliably receive and hold the mating ball so as to achieve the desired adjustable mounting arrangement.

As an additional matter, headlamp mounting schemes heretofore utilized have generally required a number of different components for providing the necessary pivotal or movable mounting of the headlamp assembly to permit both horizontal and vertical adjustment, while holding the same in a fixed and rigid condition once the adjustment is accomplished. Moreover, such mounting members must provide not only for the desired adjustment, but also maintain a relatively rigid coupling in all other possible planes or directions of motion, while yet permitting the desired vertical and horizontal tilting or pivoting motion for aiming. Accordingly, the prior art has provided a number of mounting mechanisms, some of which provide mounting at given points or locations on the headlamp assembly, and others of which provide the necessary adjustment forces by means of movable shafts, gears and the like as discussed above, for coupling with other suitable points or locations of the headlamp assembly.

Briefly, it is an object of the present invention to provide novel and improved means for mounting a headlamp assembly to a vehicle frame and for accomplishing the desired adjustment of the same for achieving the desired aiming of the headlamp beam. Accordingly, the present invention is directed to a plurality of cooperating mounting and adjustment members and assemblies for achieving this desired adjustable mounting of a headlamp assembly relative to a vehicle frame.

BRIEF DESCRIPTION OF THE DRAWINGS

The features of the present invention which are believed to be novel are set forth with particularity in the appended claims. The organization and manner of operation of the invention, together with further objects and advantages thereof, may best be understood by the reference to the following description taken in connection with the accompanying drawings in the several figures of which like reference numerals identify like elements, and in which:

FIG. 5 is an exploded perspective view of an alternate form of a slide screw assembly in accordance with the invention;

FIG. 6 is a side elevation, partially in section, illustrating the slide screw assembly of FIG. 5 in assembled condition;

FIG. 7 is an exploded perspective view of a slide screw assembly similar to that of FIGS. 5 and 6, in a somewhat modified form;

FIG. 8 is a side elevation, partially in section of the assembled slide screw assembly of FIG. 7;

FIG. 13 is a partial sectional view, illustrating assembly of the slide screw mounting assembly of FIGS. 10 through 12 with a relevant portion of a headlamp housing or the like;

DETAILED DESCRIPTION OF THE ILLUSTRATED EMBODIMENTS

Figure 1:
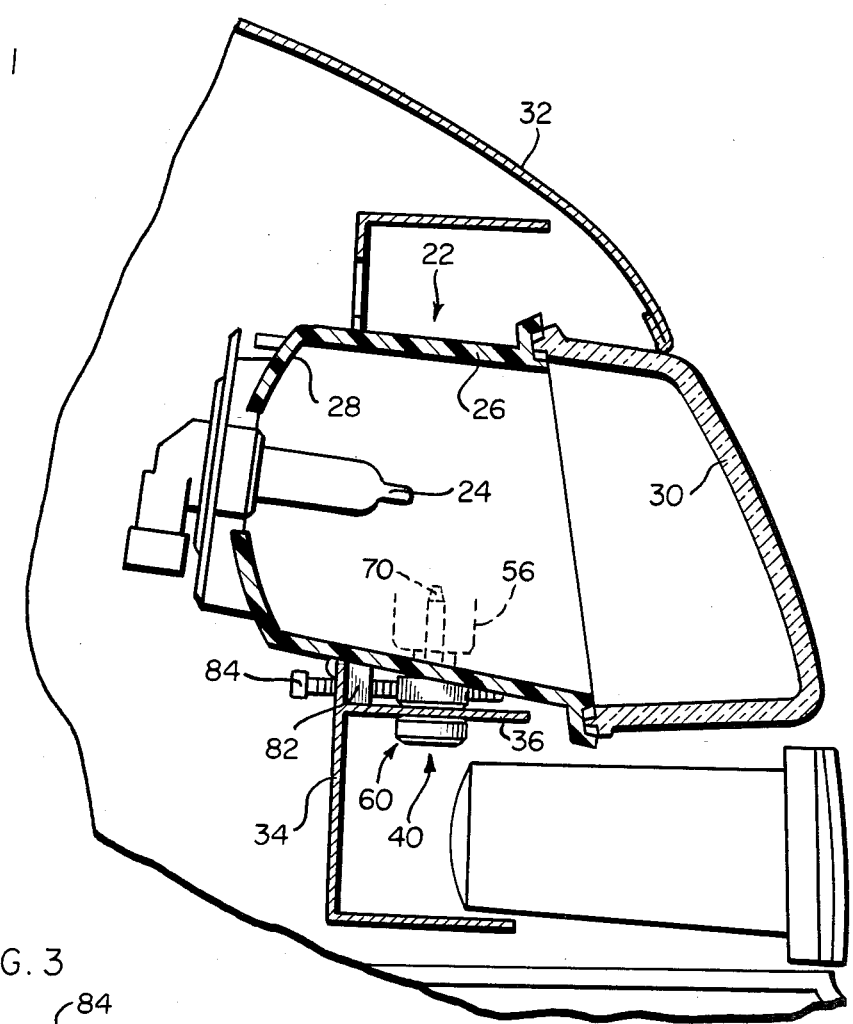
FIG. 1 is a section in elevation of a vehicle body and headlamp assembly, employing a novel and improved headlamp mounting assembly in accordance with one aspect of the invention.
Figure 3:
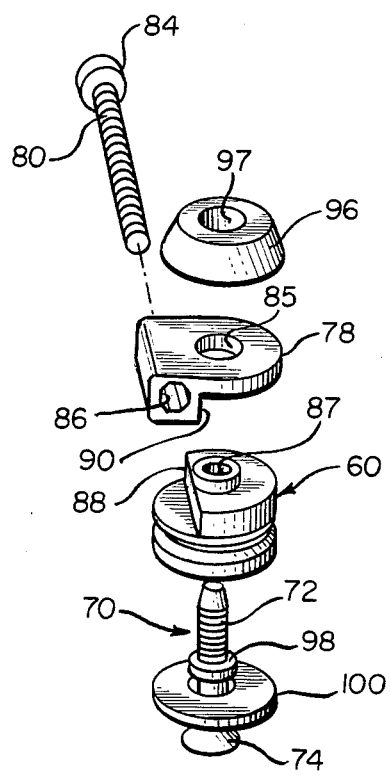
FIG. 3 is an exploded perspective view of a slide screw member of a headlamp mounting assembly utilized in the embodiment of FIGS. 1 and 2.

Referring now to the drawings, and initially to FIGS. 1 through 4, a headlamp assembly is designated generally by the reference numeral 20. The headlamp assembly 20 comprises a headlamp housing 22 housing a lamp element 24. This housing 22 preferably comprises a rear housing portion 26 which defines a suitable parabolic reflecting surface 28 and a forward housing portion 30 which is transparent and generally formed to smoothly interfit with an aerodynamically styled automotive body panel 32. The headlamp assembly 20 is preferably mounted to the automotive vehicle by means of a frame member or portion 34.

In accordance with preferred practice, the headlamp assembly 20 is mounted for generally vertical and horizontal pivotal motion relative to frame 34 so as to achieve aiming of the headlamp beam relative to the vehicle. That is, the headlamp assembly is preferably mounted to the frame 34 in such a way as to be pivotally movable a predetermined amount about a generally vertical axis to achieve horizontal aiming of the headlamp beam and about a generally horizontal axis to achieve vertical aiming of the headlamp beam. This degree of pivotal movement need only be on the order of a few degrees of arc in order to achieve the desired alignment and consequent aiming of the headlamp beam.

In accordance with one aspect of the invention, there is provided a novel and improved slide screw type of assembly for providing the desired adjustable mounting of the headlamp assembly 20 to the vehicle frame member 34 so as to permit the above-described vertical and horizontal pivotal movement of the headlamp relative to the frame to accommodate aiming of the headlamp beam. In this regard, the frame member 34 generally has a forwardly extending generally horizontal surface or wall member or portion 36 in which is disposed an elongate, horizontal slot 38 (best viewed in FIG. 2) for receiving and slidably mounting the slide screw assembly, which is generally designated by reference numeral 40.

Generally speaking, to accommodate the desired horizontal and vertical pivotal motion of the headlamp assembly 20 relative to frame 34, the assembly must be pivotally attached to the frame at least at two points. A first such pivotal attachment is provided at a generally top, center and rear portion of the headlamp assembly 20 by a mounting member or assembly 42, which is preferably engaged with the frame 34 by a pair of threaded fasteners 44 which engage complementary apertures 46 in a body portion of the mounting member 42. The mounting member 42 further includes a forwardly extending shaft-like member 48 which preferably terminates in a ball-type joint engaged within a complementary socket 50. This socket 50 is in turn fixedly mounted to a complementary aperture 52 of a mounting bracket 54 fixedly attached to a rear upper surface portion of the headlamp assembly 20, for example by a fastener 55.

Figure 2:
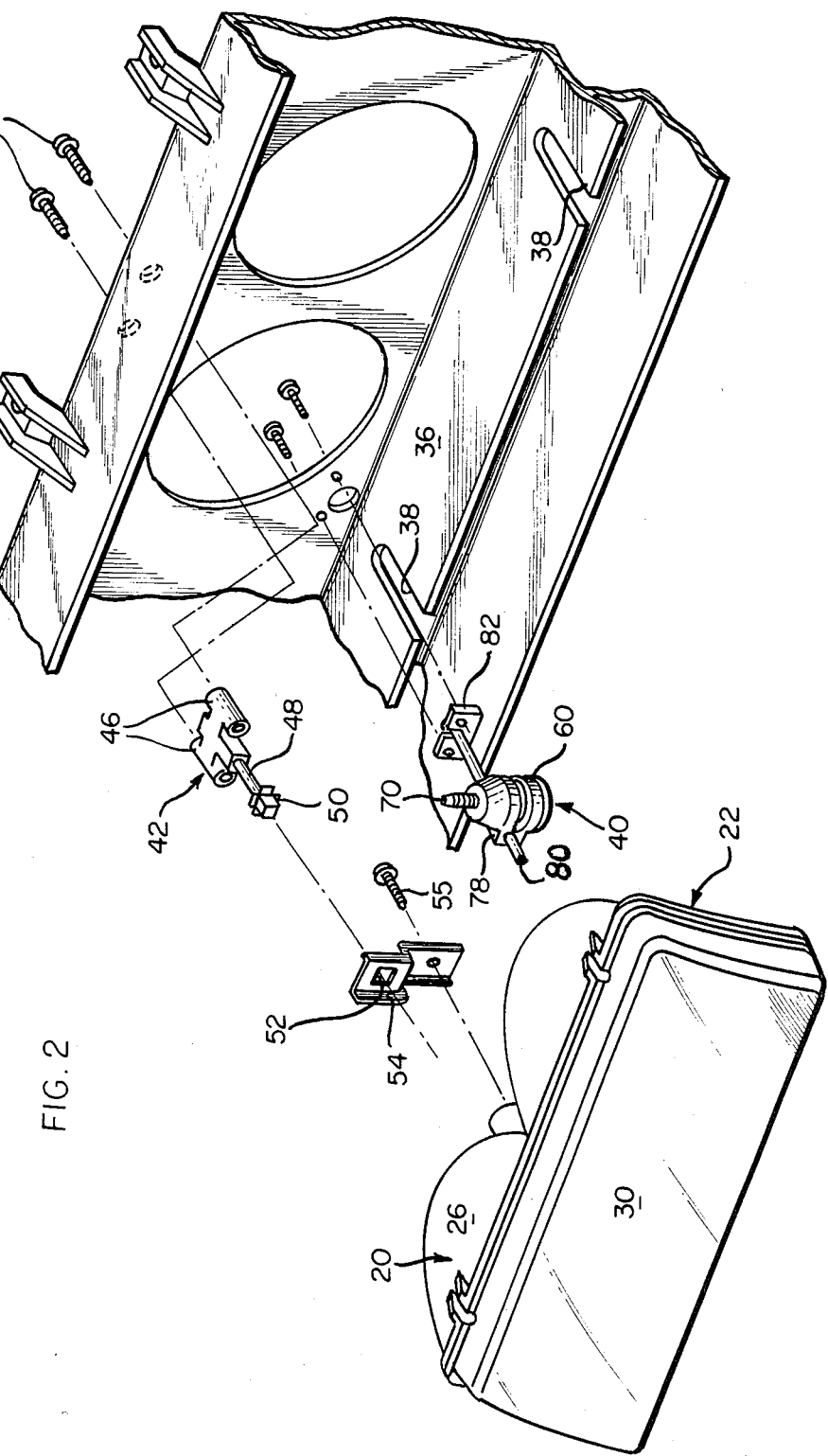
FIG. 2 is a somewhat reduced in size exploded perspective view of the assembly of FIG. 1.

In operation, the assembly of FIG. 2 is mounted for universal pivotal motion about the ball joint assembly 50. That is, an upper central portion of headlamp assembly 20 is mounted by this ball joint assembly 50 for universal pivotal motion relative to the frame 34. This pivotal motion then accommodates both the necessary horizontal and vertical directions of pivoting necessary to achieve headlamp aiming. Accordingly, upon rotation or other movement of the adjustment shaft 80, and corresponding sliding movement of slide screw assembly 40, the headlamp is pivoted about this universal or ball-type joint assembly 50 to achieve the desired vertical and horizontal pivotal motion for corresponding aiming of the headlamp beam.

Turning now to the slide screw assembly 40 in accordance with the invention, the headlamp assembly includes a suitable mounting means, here shown as an embossment 56 which has a mounting aperture 58 therein for mounting to the slide screw assembly, generally at a lower side portion of the headlamp assembly 20. Generally speaking, the slide screw assembly 40 illustrated in FIGS. 1 through 4 comprises a slot-engaging member or portion 60 of an elastomeric or rubber-like material for slidably engaging the elongate slot 38 formed in wall member 36. In this regard, as best viewed in FIG. 2, the slot 38 is open-ended, opening to the forward end of frame member 34 to receive the frame engaging member 60. This frame engaging member has a pair of spaced, generally parallel surfaces 62, 64 which are joined by a transverse, generally vertically extending support member or portion 66, which are of complementary form for slidable engagement with the slot 38 as best viewed in FIG. 4. Cooperatively, a further, headlamp frame engaging member, generally designated by reference numeral 70 comprises a threaded fastener of the type having an elongate threaded shaft portion 72 and an enlarged head portion 74. The enlarged head portion 74 is engaged with the slot-engaging member 60 and the threaded shaft extends outwardly thereof for engagement with the headlamp mounting means or aperture 58.

Advantageously, the elastomeric nature of the material, together with the generally complementary configuration of surfaces 62, 64 and support 66 relative to the wall 36 about slot 38 define a controlled amount of frictional engagement or gripping forces therebetween.

This controlled amount of engaging force or friction is such as to substantially prevent sliding movement of slide screw assembly 40 relative to slot 38 due to forces normally encountered during vehicle operation, such as vibration and the like. However, this mounting arrangement does permit such sliding movements as necessary, in response to forces intentionally applied, for achieving headlamp adjustment or aiming.

In the embodiment of FIGS. 1 through 4, the slide screw assembly 40 further includes an adjustment-shaft receiving or mounting member 78 for receiving a generally horizontally oriented adjustment shaft 80. This adjustment shaft 80 extends in a generally horizontal orientation through the frame 34, and preferably through a further mounting member or block 82. The adjusting shaft 80 of the illustrated embodiment preferably is an elongated threaded shaft having a drive head portion 84 for engagement by a suitable tool or other means for effecting rotation thereof. In this regard, one of the mounting block or member 82 and frame 34, as well as the adjusting shaft 80 includes suitable interengaged means (not shown) for preventing axial movement of the shaft relative thereto, that is axially with respect to the axis of the shaft 80. Cooperatively, the shaft-receiving member 78 includes a through threaded aperture or bore 86 for receiving the threaded shaft 80.

Accordingly, upon rotation of shaft 80, it will be seen that the engagement of the threads thereof with the threaded bore 86 will cause corresponding axial, horizontal sliding or slideable movement of the slide screw assembly 40 relative to the frame 34, and more particularly of the frame engaging member 60 relative to the elongate slot 38. This will then cause corresponding movement of the attached outer end portion of the headlamp assembly 20 relative to its central vertical axis as defined by the pivotal connection at mounting bracket 54, to achieve horizontal pivoting or aiming of the headlamp. In accordance with a preferred form of the invention, the adjustment shaft mounting member is of a relatively more rigid material than the slot engaging member so as to provide or define the prevailing torque relative to the threaded adjustment shaft 80.

In order to mount the aforementioned parts together in the desired assembled condition and alignment, the adjustment shaft mounting member and slot engaging member have alignable vertically oriented through openings 85, 87, such that the fastener shaft 72 may extend through these aligned vertically oriented openings for holding the respective parts in assembled condition with each other and with the headlamp assembly. In order to further facilitate the alignment and assembly of the foregoing parts in the desired relative orientations, the slot engaging member and adjustment shaft mounting member further include complementary engaged shoulder portions 88, 90 for defining a non-rotatable engagement in a therebetween desired relative orientation. In the embodiment illustrated in FIGS. 1 through 4, the slot-engaging member 60 further has an upwardly projecting reduced diameter sleeve-like portion 92 surrounding its vertical through aperture 87. This sleeve 92 is of complementary size and configuration for securely interfitting within the through aperture 85 of the adjustment shaft mounting member 78.

Figure 4:
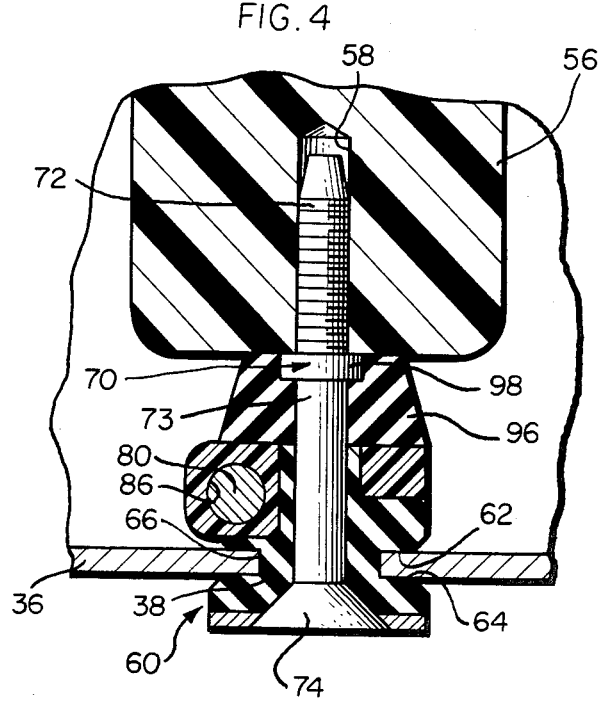
FIG. 4 is an enlarged side elevation, partially in section, further illustrating the assembly of the slide screw member of FIG. 3 with a relevant portion of the headlamp assembly of FIGS. 1 and 2.

Additionally, in the embodiment of FIGS. 1 through 4, the slide screw assembly further includes a grommet-like member 96 of an elastomeric material, similar or identical to the material of the slot-engaging member 60. This grommet-like member, in the illustrated embodiment, is generally frustoconical in shape and has a vertically oriented central through opening 97 for receiving the fastener shaft portion 72 therethrough. Moreover, the fastener shaft portion 72 preferably further includes an enlarged diameter radially outwardly projecting annular shoulder portion 98 which is axially spaced from the enlarged head 74 for grippingly engaging the shaft mounting member between the grommet-like member and the slot-engaging member and for further interengaging these three members in a coaxially assembled arrangement between the shoulder 98 and the enlarged head 74 in an assembled condition, as illustrated in FIG. 4. Preferably a portion 73 of the shaft intermediate the shoulder 98 and the enlarged head 74 is unthreaded, the threaded shaft portion 72 extending axially outwardly of the assembled parts just mentioned for engagement with the headlamp assembly 20.

In the illustrated embodiment, an additional washer member 100, preferably of a relatively strong rigid metallic material is additionally interposed beneath the head 74 of the fastener 70 for preventing the same from damaging or abrading the relatively softer elastomeric or rubber-like material of the slot engaging member 60.

Referring briefly to FIGS. 5 and 6 and to FIGS. 7 and 8, a pair of quite similar alternative forms or embodiments of a slide-screw assembly are illustrated. These forms differ from each other primarily in the specific means for accommodating a horizontal adjustment shaft or screw 80. Moreover, many of the parts of these two forms are functionally similar to the parts already described with reference to FIGS. 1 through 4. While some of the parts may be of somewhat different specific shape or configuration, those parts which perform functionally identical parts to those described above with reference to FIGS. 1 through 4 are indicated by like reference numerals together with a subscript a in the embodiment of FIGS. 5 and 6 and the subscript b in the embodiment of FIGS. 7 and 8.

Departing somewhat from the embodiment of FIGS. 1 through 4 and the embodiment of FIGS. 5 and 6, the form shown in FIGS. 7 and 8 fixedly mounts an end portion of adjustment rod or shaft member 80b. Hence, in contrast to the forms shown in the previous embodiments, in which the slide screw is threadably advanced and retracted relative to the threads of the adjustment shaft 80, 80a, the embodiment of FIGS. 7 and 8 contemplates that the shaft itself will be axially advanced and retracted relative to frame 34, without rotation responsive to engagement thereof with a mating rotating drive member (not shown). Accordingly, shaft 80b is non-rotatably attached to a shaft-receiving aperture 86b which is in the nature of an open-ended slot in the shaft mounting member 78b. Cooperatively, the end portion 102 of the shaft 80b is formed as a generally flat, spade-like member to extend into slot 86b. In order to hold this end portion 102 of the shaft 80b in engagement with the member 78b, a transversely extending fastener member 104 is engaged with a transverse through bore or aperture 106 through the body of the member 78b. This bore 106 is arranged to intersect and coaxially align with a through, preferably threaded aperture 108 in the spade-like shaft end or mounting portion 102.

Identical additional slide screw assemblies 40, 40a or 40b may also be utilized to accommodate the desired pivotal and slidable mounting of the opposite side of the headlamp housing 22, relative to an opposite and similar elongate, open-ended slot 38 of the frame member 34. These latter slide screw assemblies will not be coupled with any adjustment member such as the adjustment shaft 80, 80a or 80b, but will serve merely as pivotal, slidable mounting points for the opposite side of the headlamp housing 20, to accommodate or permit the desired movement for adjustment thereof while holding the same securely mounted relative to the frame 34. Hence, in accordance with the invention a single type of slide screw assembly 40, 40a or 40b may be utilized to mount both sides of the headlamp housing 22.

In this regard, it will be noted that the construction of each of these slide screw assemblies heretofore described is symmetrical, such that these assemblies are not "right-handed" or "left-handed" as such but may be used interchangeably to mount either side of the housing 22 relative to the frame 34. Moreover, since each is provided with an adjustment screw mounting member or portion 78, 78a, 78b, this portion need only be rotated to the desired orientation to receive the adjusting shaft member, when the slide screw assembly is utilized to mount that side of the headlamp which is to be operatively coupled to and adjusted by the adjustment member. As already indicated, the adjustment member receiving portion 78, 78a or 78b of the second slide screw assembly will not be utilized. However, this arrangement greatly simplifies assembly, since the assembler need only draw from a supply of one type of preassembled part, which can be used interchangeably to mount either side of the headlamp, thus greatly simplifying the assembly operation and avoiding possible errors in selection and assembly of parts.

Figure 9:
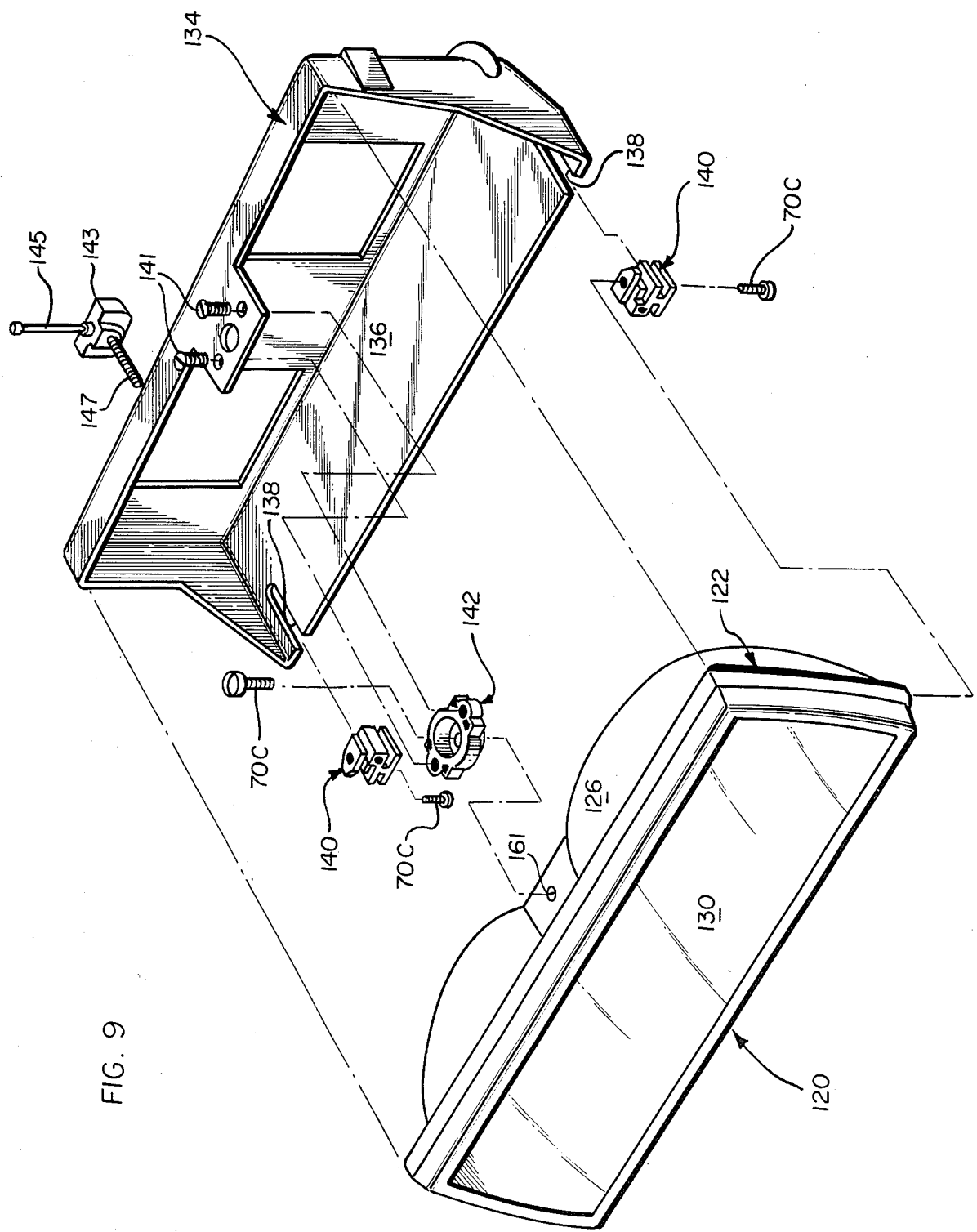
FIG. 9 is an exploded perspective view, similar to FIG. 2, of a headlamp assembly, including members of a mounting assembly in accordance with another aspect of the invention.
Figure 10:
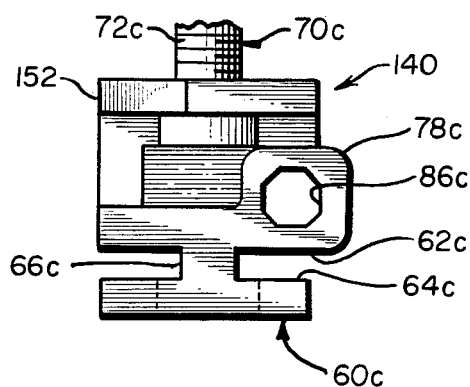
FIG. 10 is a side elevation of a slide screw mounting member or assembly in accordance with another form of the invention, and as illustrated for use in the embodiment of FIG. 9.
Figure 12:
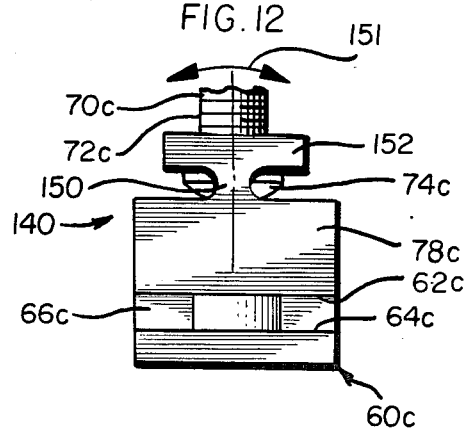
FIG. 12 is a side elevation taken generally in the plane of the line 12—12 of FIG. 11.
Figure 11:
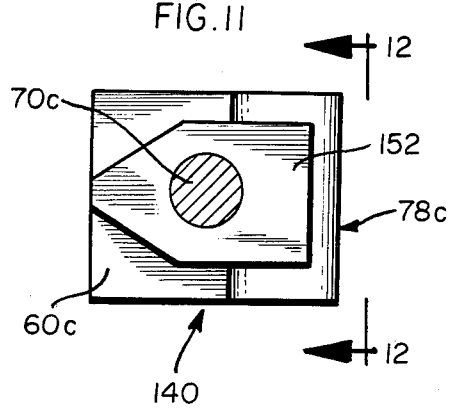
FIG. 11 is a top plan view taken generally in the plane of the line 11—11 of FIG. 10.

Referring now to the remaining figures of drawing, in FIG. 9, an alternative form of headlamp assembly and mounting bracket or frame member of a vehicle are illustrated in exploded perspective view. In similar fashion to the headlamp assembly and frame member or portion shown in FIGS. 1 and 2, the arrangement of FIG. 9 includes a headlamp assembly 120 comprising a housing 122 having a rear housing half or portion 126 and a transparent forward housing half or portion 130. The frame member 134 has a pair of elongate, open-ended slots 138 for slidably mounting a pair of identical slide screw-type mounting assemblies 140 which are configured in accordance with another embodiment of the invention.

The embodiment of FIG. 9 also includes a further, center mounting assembly or center pivot 142 in accordance with a further aspect of the invention, which mounts to frame 134 by fasteners 141 and to an aperture 161 in housing 122 by fastener 70c. The adjustable mounting arrangement of FIG. 9 also includes at least one adjustment member, here illustrated as a horizontal adjustment member or gearbox assembly 143. Briefly, the gearbox assembly 143 includes a vertically extending drive shaft member 145 and a generally horizontally extending and preferably threaded adjustment shaft member 147. Between these two members, a gearbox 143 mounts suitable crown or bevel type gears for transmitting motion between the generally orthogonally disposed shaft members 145 and 147. Other arrangements may be used without departing from the invention. Suffice it to say that the adjustment shaft member 147 is advantageously accommodated by the corresponding one of the slide screw members 140. In similar fashion to the previous embodiments, this member 140 is coupled between the adjustment shaft and headlamp housing 122 for imparting the desired horizontal adjusting motion thereto, as the member 140 slides relative to slot 138. The slide screw assembly 140 at the opposite side of the assembly of FIG. 9 does not receive such an adjusting shaft, but nonetheless permits similar sliding, and as will be seen presently, pivotal motion, to accommodate the desired vertical and horizontal adjustments of the headlamp housing 122 relative to the frame 134, to achieve headlamp aiming as discussed above.

Referring now also to FIGS. 10 through 13, the mounting or slide screw assembly 140 shares a number of structural features and functions with the slide screw assemblies heretofore described. However, slide screw assembly 140 embodies the slot engaging member or portion and adjustment shaft mounting member or portion in a single, integrally molded part, preferably of an elastomeric or rubber-like material. In this regard, functionally similar parts and components of the slide screw assembly or member 140 are herein described and indicated in the drawings by similar reference numerals to those used above with the suffix c.

Accordingly, the slide screw assembly 140 defines a slot engaging portion 60c of an elastomeric, rubber-like material for slidably engaging the elongate slot 38. This slot engaging portion 60c defines a pair of spaced parallel surfaces 62c, 64c which are joined by a transverse support member 66c. A headlamp frame engaging member also includes threaded fastener type member 70c, which has an elongate, threaded shaft portion 72c and an enlarged head portion 74c.

Departing from the previous embodiments, the slide screw assembly 140 further includes an upwardly projecting flexible neck portion 150. This neck 150 is positionable intermediate the frame and the headlamp for flexing to permit a predetermined amount of pivotal motion of the headlamp relative to the frame about a generally vertical plane defined by neck 150. This motion is indicated by the arcuate double arrows 151 in FIG. 12. This neck portion 150 terminates in a fastener engaging portion 152 for engaging the enlarged head 74c and a portion of shaft 72c of the fastener 70c, such that the shaft 72c projects a good distance outwardly thereof for engagement with the headlamp housing 122. Accordingly, the relatively decreased thickness of the intermediate neck portion 150 permits pivotal motion generally along the arc 151 a few degrees to either side of the centered or non-deformed condition illustrated in FIG. 12, to permit similar pivotal motion of the headlamp housing 122 relative to the frame 134.

Referring briefly to FIG. 9, this pivotal motion occurs in a generally fore and aft fashion relative to the front transparent face or housing portion 130 of the headlamp assembly 120. That is, this tilting is such as to accommodate some vertical tilting about a horizontal axis, to achieve vertical aiming of the headlamp. Relative pivotal motion in the horizontal plane, to accommodate some degree of horizontal pivoting or tilting of the headlamp is accommodated by the fastener 70c as will be explained more fully hereinbelow. However, it should be noted that the necessary tilting or pivotal motion for horizontal headlamp adjustment or aiming is also accommodated by the slidable nature of the respective members 140 with respect to the oppositely laterally located slots 138, in response to the adjustment shaft member 147.

In similar fashion to the previous embodiments, slide screw member or assembly 140 includes an adjustment shaft mounting member or portion 78c for receiving a generally horizontally oriented adjustment shaft 147 for achieving the desired slidable movement as just described. This adjustment shaft mounting member includes a through and preferably threaded opening 86c for threadable engagement with the threaded adjustment shaft 147.

Figure 13:
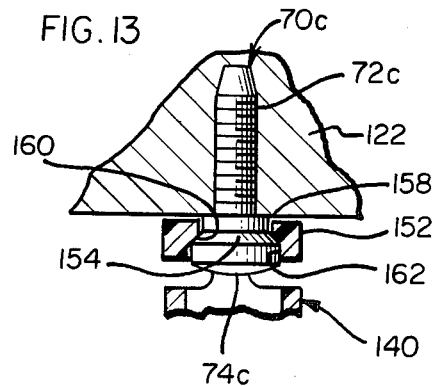
Figure 14:
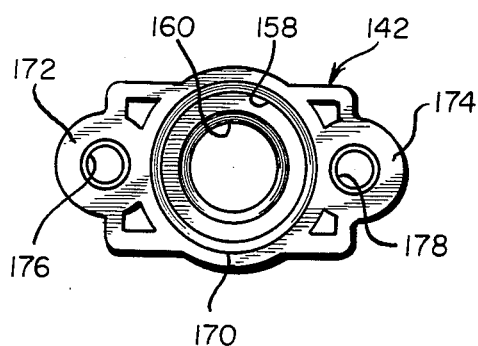
FIG. 14 is a plan view of a center pivot assembly in accordance with yet another aspect of the invention.
Figure 15:
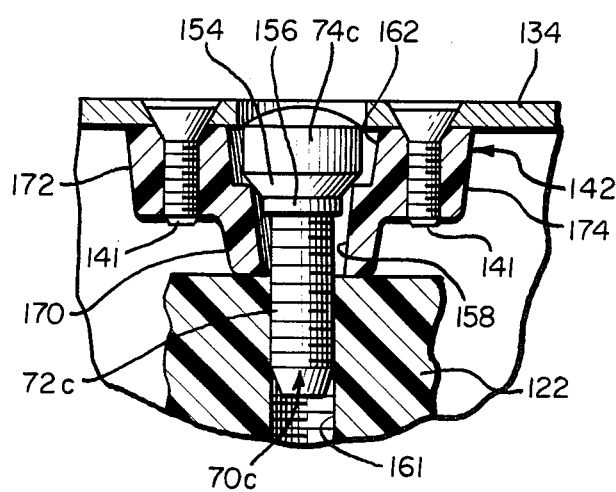
FIG. 15 is a side elevation, partially in section, of the center pivot assembly of FIG. 14.

In order to accommodate some degree of additional tilting or pivotal motion, as well as rotational motion of the housing 122 relative to the member 140, the fastener 70c and the fastener mounting portion 152 include additional features. In this regard, the fastener 70c includes a circumferential beveled portion or bevel 154 joining the shaft portion 72c and head portion 74c. The fastener engaging portion 152 defines a complementary, somewhat enlarged through aperture 158 also having a complementary beveled surface 160 about an entrance thereof for receiving the beveled shoulder portion 154. The enlarged aperture 158 of the fastener engaging portion 152 is further somewhat oversized at 162 relative to the fastener head 74c, bevel 154 and shoulder 156 for loosely engaging the same. This somewhat loose engagement permits a predetermined amount of pivotal motion of the fastener shaft 72 relative to the fastener engaging portion 152, transversely to the axis of the fastener shaft 72c. Moreover, shoulder 156 extends axially outwardly of opening 158 somewhat, such that the facing surface of headlamp housing 122 contacts shoulder 156 but not the surface of portion 152. This arrangement permits relative rotation of headlamp housing 122 about the axis of fastener shaft 70c. These pivotal and rotational motions permit corresponding motion of the headlamp relative to the frame. Referring now more particularly to FIGS. 14 and 15, a mounting member or assembly is designated generally by the reference numeral 142. This mounting member or assembly 142 is configured as a center pivot assembly for providing a center pivot or pivotal mounting point to the headlamp assembly or housing 122 relative to the frame 134 (see FIG. 9). This center pivot assembly or mounting member 142 is virtually identical with the mounting assembly or member of FIGS. 10 through 13 insofar as the manner in which it utilizes a threaded fastener type of mounting member or so-called "shoulder screw" arrangement to achieve the desired relative movement between the headlamp housing and the frame. In this regard, the center pivot member or assembly 142 has a frame-engaging portion, which here takes the form of oppositely outwardly projecting apertured ears 172 and 174. Through mounting apertures 176 and 178 are provided in these ears for receiving suitable fasteners for engaging the center pivot to the frame 134 as indicated in FIG. 9. These mounting ears and through bores or apertures are symmetrically formed to either side of, and preferably integrally with, the fastener-receiving or engaging portion 170, which mounts the fastener 70c.

As indicated above, fastener 70c is identical to the fastener described hereinabove with reference particularly to FIG. 13, in that it includes a threaded shaft 72c, an enlarged head portion 74c and an intermediate or joining bevel portion 154, with axially extending shoulder 156. In order to allow some degree of play, both for rotation and pivotal motion between the fastener and the fastener-receiving portion 170, the latter is provided with an enlarged through aperture 158. This enlarged through aperture 158 and a further enlarged portion 162 are configured for loosely engaging with the fastener head 74c, bevel 154 and shoulder 156, to permit a predetermined amount of relative movement therebetween. This predetermined amount of movement is such as to permit a desired and corresponding amount of movement of the headlamp housing relative to the frame 34 during adjustment thereof in the area where the center pivot assembly 142 is coupled therewith.

While particular embodiments of the invention have been shown and described, it will be obvious to those skilled in the art that changes and modifications of the present invention, in its various aspects, may be made without departing from the invention in its broader aspects, some of which changes and modifications being matters of routine engineering or design, and others being apparent only after study. As such, the scope of the invention should not be limited by the particular embodiment and specific construction described herein but should be defined by the appended claims and equivalents thereof. Accordingly, the aim in the appended claims is to cover all such changes and modifications as fall within the true spirit and scope of the invention.

The invention is claimed as follows:

1. A slide screw assembly for providing an adjustable, off-center mounting of a headlamp assembly or the like relative to a rigid automobile frame member or the like so as to permit both vertical and horizontal pivotal movement of the headlamp assembly about its center relative to the frame to allow aiming of the headlamp beam, said frame member having an elongate slot for slidably mounting said slide screw assembly and said headlamp assembly having a housing and means for accommodating said off-center mounting of said housing to said slide screw assembly to permit the desired vertical and horizontal pivotal movement for adjustment thereof relative to the frame, said slike screw assembly comprising: a slot engaging member of an elastomeric, rubbber-like material for slidably engaging said elongate slot of said frame member and having a pair of spaced parallel surfaces joined by a transverse, generally vertical support portion configured and arranged for slidable engagement with said elongate slot while imparting a controlled amount of gripping frictional force to said engagement so as to be slidable in response to forces applied to said headlamp assembly for adjustment of the aiming thereof and substantially resisting movement due to vibrational forces and the like; a headlamp frame engaging member comprising a threaded fastener having an elongate threaded shaft and an enlarged head, said enlarged head being engaged with said slot engaging member and said threaded shaft extending outwardly thereof for engagement with said headlamp housing mounting means.

2. A slide screw assembly according to claim 1 wherein said slot engaging member further includes an upwardly projecting flexible neck portion positionable intermediate said frame and said headlamp for flexing to permit a predetermined amount of pivotal motion of the headlamp relative to the frame about a generally vertical plane generally defined by said neck portion to accommodate vertical adjustment of the headlamp, said neck portion terminating in a fastener engaging portion for rotatably mounting said enlarged head of said fastener with said shaft projecting outwardly thereof to permit a predetermined amount of rotational motion of the headlamp relative to said slide screw assembly about an axis defined by the fastener shaft portion to accommodate horizontal adjustment of the headlamp assembly.

3. A slide screw assembly according to claim 1 and further including an adjustment shaft mounting portion for receiving a generally horizontally oriented adjustment shaft for achieving slidable movement in a generally horizontal plane of said slide screw assembly so as to achieve corresponding movement of said headlamp for adjustment and aiming thereof.

4. A slide screw assembly according to claim 3 wherein said adjustment shaft mounting portion comprises a member defining a through threaded aperture, said member being of a relatively more rigid material than said slot engaging member for defining the prevailing torque relative to said adjustment shaft, said adjustment shaft mounting member and said slot engaging member having vertically oriented aligned through openings, and said fastener shaft portion extending through said aligned vertically oriented openings for holding the respective parts in assembled condition with each other and with said headlamp assembly.

5. A slide screw assembly according to claim 4 and further including a grommet-like member of an elastomeric material similar to the material of said slot-engaging member for overlying said adjustment shaft mounting member and having a generally vertically oriented through opening alignable with the vertically oriented through openings of the adjustment shaft mounting member and slot engaging member for receiving said threaded shaft of said fastener member therethrough, and wherein said fastener shaft has an enlarged diameter shoulder portion spaced apart from said head portion for engaging the slot engaging member, the adjustment shaft mounting member and the grommet-like member therebetween in assembled condition, a threaded end part of said fastener shaft extending outwardly of the assembly for engagement with said headlamp assembly mounting means.

6. A slide screw assembly according to claim 2 wherein said fastener comprises a threaded fastener having a circumferentially extending shoulder portion between said shaft and said head portion, and wherein said fastener engaging portion of said flexible neck member defines a complementary through aperture having an annular surface about an entrance thereof opening to an enlarged diameter surface for receiving said shoulder portion and enlarged head portion, respectively, of said fastener therein, said fastener engaging portion aperture being sized for receiving the fastener head, shoulder and shaft portions with the shoulder portion extending axially outwardly of the aperture to permit a predetermined amount of pivotal motion of the shaft portion relative to the fastener engaging portion about said interengaged portions thereof and to permit rotational motion of the headlamp housing relative to the fastener shaft, so as to thereby permit a predetermined amount of corresponding tilting, pivotal and rotational motion of said headlamp housing relative to the frame member.

7. A slide screw assembly according to claim 4 wherein said adjustment shaft mounting member and said slot engaging member have complementary, interengaged shoulder surface portions for preventing relative rotation therebetween.

8. A slide screw assembly according to claim 3 wherein said adjustment shaft mounting portion defines a generally horizontally oriented through threaded opening for receiving a complementary threaded shaft of a horizontal adjustment member.

9. A slide screw assembly according to claim 3 wherein said adjustment shaft mounting portion has an end opening for receiving an end portion of an adjustment shaft therewithin and a transverse, fastener-receiving opening for receiving a fastener transversely therethrough for fastening said end portion of said adjustment shaft thereto.

10. A center pivot assembly for providing a pivotal mounting of a headlamp assembly or the like relative to a rigid automobile frame member or the like, substantially at a horizontally centrally located point on said headlamp assembly, so as to permit both vertical and horizontal pivotal movement of the headlamp assembly about to center relative to the frame to allow aiming of the headlamp beam, said frame member having mounting means for mounting said center pivot assembly and said headlamp assembly having a housing and means for mounting said housing to said center pivot assembly to permit the desired vertical and horizontal pivotal movement for adjustment thereof relative to the frame, said center pivot assembly comprising: a frame-engaging portion for engagement with said mounting means of said frame, a fastener receiving portion, and a threaded fastener engaged with said fastener receiving portion of said center pivot assembly and also with said mounting means of said headlamp assembly; wherein said fastener comprises a threaded fastener having an elongate, threaded shaft portion and an enlarged head portion, and further having a circumferentially extending annular shoulder portion between the shaft and head portions; and wherein said fastener engaging portion of said center pivot member defines a complementary through aperture having an annular surface about an entrance thereof to receive the shoulder portion of the fastener, said fastener engaging portion through opening being further sized for loosely engaging the fastener head, shoulder and shaft portions with the shoulder portion extending axially outwardly of the aperture to permit a predetermined amount of pivotal motion of the fastener relative to the fastener engaging portion about said interengaged portions thereof, and to permit rotational motion of the headlamp housing relative to the fastener shaft, so as to permit a corresponding and predetermined amount of tilting, pivotal motion of said headlamp assembly relative to the center pivot assembly and also a predetermined amount of rotational motion of the headlamp assembly relative to the center pivot assembly about an axis generally defined by said fastener threaded shaft.

11. A mounting assembly for providing a pivotal mounting of a headlamp assembly or the like relative to a rigid automobile frame member or the like, at a given point on said headlamp assembly so as to permit both vertical and horizontal pivotal movement of the headlamp assembly about its center relative to the frame to allow aiming of the headlamp beam, said frame member having means for mounting said mounting assembly and said headlamp assembly having a housing and means for mounting said housing to said mounting assembly to permit the desired vertical and horizontal pivotal movement for adjustment thereof relative to the frame, said mounting assembly comprising: a frame-engaging portion for engagement with said mounting means of said frame, a fastener receiving portion, and a threaded fastener engaged with said fastener receiving portion of said mounting assembly and also with said mounting means of said headlamp assembly; wherein said fastener comprises a threaded fastener having an elongate, threaded shaft portion and an enlarged head portion, and further having a circumferentially extending annular shoulder portion between the shaft and head portions; and wherein said fastener engaging portion of said mounting member defines a complementary through aperture having an annular surface about an entrance thereof to receive the shoulder portion of the fastener, said fastener engaging portion through opening being sized for receiving the fastener head, shoulder and shaft portions with the shoulder portion extending axially outwardly of the aperture and to permit rotational motion of the headlamp housing relative to the fastener shaft, so as to permit a corresponding and predetermined amount of rotational motion of the headlamp assembly relative to the mounting assembly about an axis generally defined by said fastener threaded shaft.

12. A mounting assembly according to claim 11 wherein said frame-engaging portion comprises a pair of apertured mounting ears extending symmetrically outwardly relative to said fastener receiving portion for receiving fasteners therethrough for mounting said assembly to a central portion of said frame and of said headlamp assembly for use as a center pivot.

13. A mounting assembly according to claim 11 wherein said frame engaging portion further includes an upwardly projecting flexible neck portion positionable intermediate said frame and said headlamp for flexing to permit a predetermined amount of pivotal motion of the headlamp relative to the frame about a generally vertical plane generally defined by said neck portion to accommodate vertical adjustment of the headlamp, said neck portion terminating in a fastener engaging portion for rotatably mounting said enlarged head of said fastener with said shaft projecting outwardly thereof to permit a predetermined amount of rotatitonal motion of the headlamp relative to said mounting assembly about an axis defined by the fastener shaft portion to accommodate horizontal adjustment of the headlamp assembly.

14. A mounting assembly according to claim 11 and further including an adjustment shaft mounting portion for receiving a generally horizontally oriented adjustment shaft for achieving slidable movement in a generally horizontal plane of said slide screw assembly so as to achieve corresponding movement of said headlamp for adjustment and aiming thereof.

15. A mounting assembly according to claim 14 wherein said adjustment shaft mounting portion defines a generally horizontally oriented through threaded opening for receiving a complementary threaded shaft of a horizontal adjustment member.

16. A mounting assembly according to claim 14 wherein said adjustment shaft mounting portion has an end opening for receiving an end portion of an adjustment shaft therewithin and a transverse, fastener-receiving opening for receiving a fastener transversely therethrough for fastening said end portion of said adjustment shaft thereto.

17. A system according to claim 11, wherein said frame-engaging portion comprises a pair of apertured mounting ears extending symmetrically outwardly relative to said fastener receiving portion for receiving fasteners therethrough for mounting said assembly to a central portion of said frame and of said headlamp assembly for use as a center pivot.

18. An adjustable automotive headlamp system comprising: a frame member; a headlamp assembly, and a slide screw assembly for providing an adjustable, off-center mounting of the headlamp assembly relative to the frame member so as to permit both vertical and horizontal pivotal movement of the headlamp assembly about its center relative to the frame member to allow aiming of the headlamp beam; said frame member having an elongate slot for slidably mounting said slide screw assembly and said headlamp assembly having a housing and means for accommodating said off-center mounting of said housing to said slide screw assembly to permit the desired vertical and horizontal pivotal movement for adjustment thereof relative to the frame; said slide screw assembly comprising a slot engaging member of an elastomeric, rubber-like material for slidably engaging said elongate slot of said frame member and having a pair of spaced parallel surfaces joined by a transverse, generally vertical support portion configured and arranged for slidable engagement with said elongate slot while imparting a controlled amount of gripping frictional force to said engagement so as to be slidable in response to forces applied to said headlamp assembly for adjustment of the aiming thereof and substantially resisting movement due to vibrational forces and the like; and a headlamp frame engaging member comprising a threaded fastener having an elongate threaded shaft and an enlarged head being engaged with said slot engaging member and said threaded shaft extending outwardly thereof for engagement with said headlamp housing mounting means.

19. An adjustable automotive headlamp system comprising: a headlamp assembly; a frame member, and a mounting assembly for providing a pivotal mounting of the headlamp assembly relative to the frame member at a given point on said headlamp assembly so as to permit both vertical and horizontal pivotal movement of the headlamp assembly relative to the frame to allow aiming of the headlamp beam, said frame member having means for mounting said mounting assembly and said headlamp assembly having a housing and means for mounting said housing to said mounting assembly to permit the desired vertical and horizontal pivotal movement for adjustment thereof relative to the frame; said mounting assembly comprising a frame-engaging portion for engagement with said mounting means of said frame, a fastener receiving portion, and a fastener engaged with said fastener receiving portion of said mounting assembly and also with said mounting means of said headlamp assembly; wherein said fastener comprises a threaded fastener having an elongate, threaded shaft portion and an enlarged head portion, and further having a circumferentially extending annular shoulder portion between the shaft and head portions; and wherein said fastener engaging portion of said mounting member defines a complementary through aperture having an annular surface about an entrance thereof to receive the shoulder portion of the fastener, said fastener engaging portion through opening being sized for receiving the fastener head, shoulder and shaft portions with the shoulder portion extending axially outwardly of the aperture and to permit rotational motion of the headlamp housing relative to the fastener shaft, so as to permit a corresponding and predetermined amount of rotational motion of the headlamp assembly relative to the mounting assembly about an axis generally defined by said fastener threaded shaft.

* * * * *